(12) United States Patent
Kurata et al.

(10) Patent No.: US 10,843,530 B2
(45) Date of Patent: Nov. 24, 2020

(54) VEHICLE AIR CONDITIONING DEVICE

(71) Applicant: DENSO CORPORATION, Kariya (JP)

(72) Inventors: Shun Kurata, Kariya (JP); Yoshiharu Endo, Kariya (JP); Takahiro Suzuki, Kariya (JP); Takeshi Miyamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 131 days.

(21) Appl. No.: 16/242,029

(22) Filed: Jan. 8, 2019

(65) Prior Publication Data
US 2019/0152298 A1 May 23, 2019

Related U.S. Application Data

(63) Continuation of application No. PCT/JP2017/022908, filed on Jun. 21, 2017.

(30) Foreign Application Priority Data

Jul. 11, 2016 (JP) ................. 2016-136720

(51) Int. Cl.
B60H 1/32 (2006.01)
F25B 1/00 (2006.01)
B60H 1/00 (2006.01)

(52) U.S. Cl.
CPC ............. B60H 1/3211 (2013.01); B60H 1/32 (2013.01); F25B 1/00 (2013.01); B60H 2001/006 (2013.01); B60H 2001/3266 (2013.01); B60H 2001/3272 (2013.01); B60H 2001/3273 (2013.01); F25B 2500/12 (2013.01); F25B 2600/025 (2013.01)

(58) Field of Classification Search
CPC .. B60H 1/32; B60H 1/3211; B60H 2001/006; B60H 2001/3266; B60H 2001/3272; B60H 2001/3273; F25B 2500/12; F25B 2600/025
See application file for complete search history.

(56) References Cited

U.S. PATENT DOCUMENTS

| 7,832,221 B2 * | 11/2010 | Wijaya | B60H 1/3208 62/133 |
| 2004/0172959 A1 | 9/2004 | Oomura et al. | |
| 2004/0206102 A1 * | 10/2004 | Homan | B60H 1/322 62/228.1 |
| 2006/0005552 A1 * | 1/2006 | Anyoji | B60H 1/00764 62/133 |
| 2011/0146320 A1 | 6/2011 | Tomiyama et al. | |

(Continued)

FOREIGN PATENT DOCUMENTS

JP 2003341335 A 12/2003
JP 4048968 B2 2/2008
(Continued)

Primary Examiner — Marc E Norman
(74) Attorney, Agent, or Firm — Harness, Dickey & Pierce, P.L.C.

(57) ABSTRACT

A vehicle air conditioning device includes a compressor and a controller. The controller is configured to set an upper limit value of the rotation speed of the compressor based on a combination of whether the speed of the vehicle is lower than a predetermined speed and whether a rotation speed of a fan device for a condenser is lower than a predetermined rotation speed.

3 Claims, 8 Drawing Sheets

(56) References Cited

U.S. PATENT DOCUMENTS

2013/0139532 A1    6/2013   Hashigaya et al.
2013/0160986 A1*   6/2013   Hashigaya ........... B60H 1/3208
                                                        165/202
2019/0316822 A1*  10/2019   Tada ..................... F25B 1/00

FOREIGN PATENT DOCUMENTS

JP         2011126409 A     6/2011
WO     WO-2011148736 A1    12/2011

* cited by examiner

VEHICLE AIR CONDITIONING DEVICE

CROSS REFERENCE TO RELATED APPLICATIONS

The present application is a continuation application of International Patent Application No. PCT/JP2017/022908 filed on Jun. 21, 2017, which designated the United States and claims the benefit of priority from Japanese Patent Application No. 2016-136720 filed on Jul. 11, 2016. The entire disclosures of all of the above applications are incorporated herein by reference.

TECHNICAL FIELD

The present disclosure relates to a vehicle air conditioning device.

BACKGROUND

A vehicle air conditioning device typically includes a refrigeration cycle device for cooling air-conditioning air to be blown into a passenger compartment. The refrigeration cycle device, in turn, typically includes an electric compressor. When a vehicle is traveling at a low speed, the operation sound of the electric compressor may be easily perceived as noise.

SUMMARY

According to one aspect of the present disclosure, a vehicle air conditioning device may include a compressor, a condenser, an expansion valve, an evaporator, and a controller. The compressor compresses refrigerant. The condenser cools the refrigerant discharged from the compressor by exchanging heat between the refrigerant and air. The expansion valve expands the refrigerant discharged from the condenser. The evaporator cools air-conditioning air, which is to be blown into a passenger compartment, by exchanging heat between the refrigerant discharged from the expansion valve and the air-conditioning air. The controller controls the compressor. The controller is configured to set an upper limit value of a rotation speed of the compressor to a first upper limit value when a speed of a vehicle is equal to or higher than a predetermined speed. Further, the controller is configured to set the upper limit value of the rotation speed of the compressor to a second upper limit value smaller than the first upper limit value when the speed of the vehicle is lower than the predetermined speed and a rotation speed of a fan device that sends air to the condenser is lower than a predetermined rotation speed. Further, the controller is configured to set the upper limit value of the rotation speed of the compressor to a third upper limit value smaller than the first upper limit value and larger than the second upper limit value when the speed of the vehicle is lower than the predetermined speed and the rotation speed of the fan device is equal to or higher than the predetermined rotation speed.

DETAILED DESCRIPTION

Hereinafter, an embodiment of a vehicle air conditioning device will be described. First, the outline of the vehicle air conditioning device of the present embodiment will be described.

Figure 1:
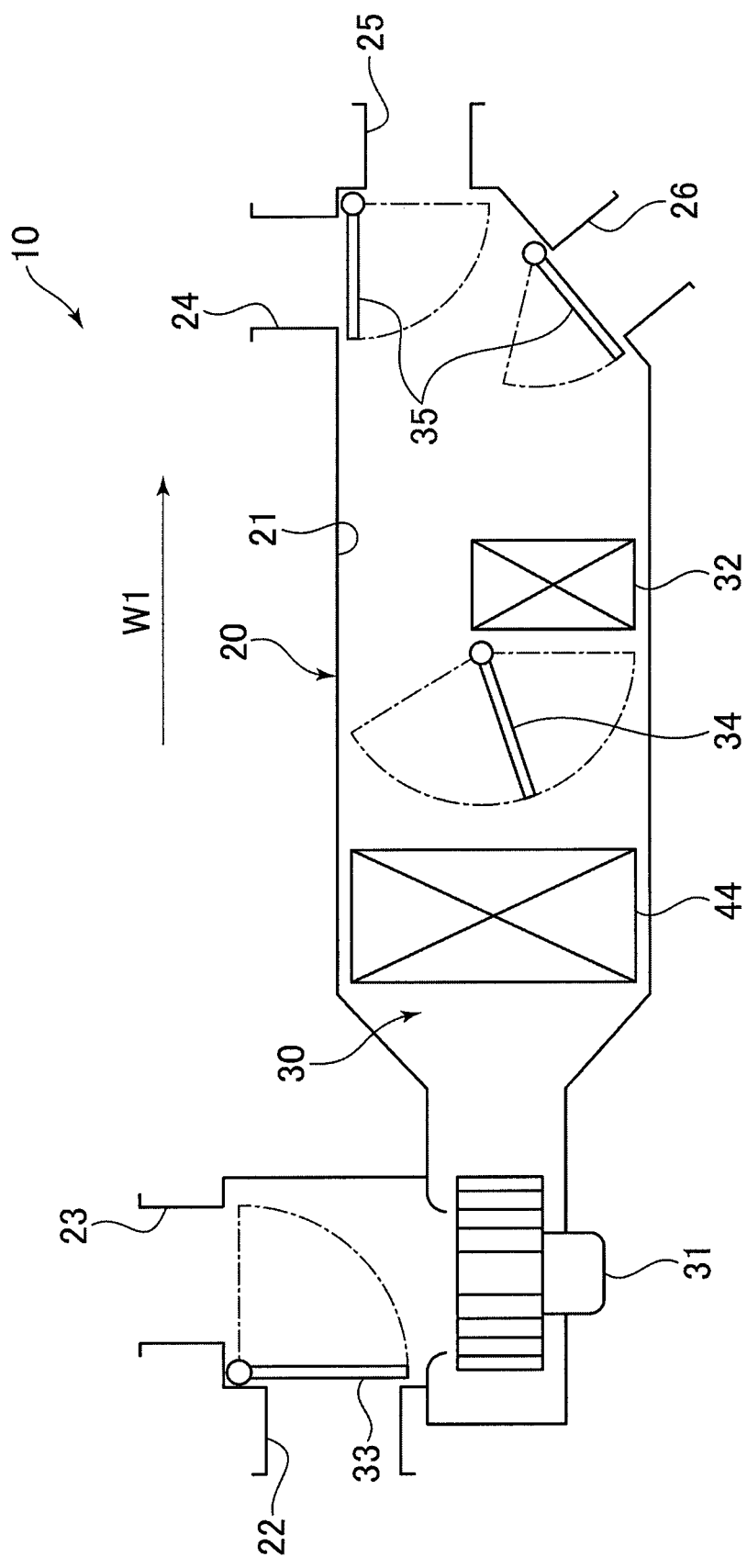
FIG. 1 is a schematic view illustrating a configuration of a vehicle air conditioning device of an embodiment.

As shown in FIG. 1, a vehicle air conditioning device 10 of the present embodiment includes an air conditioning case 20 and an air conditioning unit 30. The vehicle air conditioning device 10 is provided inside the instrument panel of the vehicle.

An air passage 21 is formed inside the air conditioning case 20. The air passage 21 is a passage for guiding air-conditioning air into the passenger compartment. The air-conditioning air is air for adjusting the temperature inside the passenger compartment. In the air passage 21, the air-conditioning air flows in the direction indicated by the arrow W1 in the drawing.

An outside air intake port 22 and an inside air intake port 23 are formed at an upstream portion of the air conditioning case 20 in the air flow direction W1. The outside air intake port 22 and the inside air intake port 23 are formed as portions for taking in air into the air passage 21. The outside air intake port 22 is a portion that takes outside air, which is the air outside the passenger compartment, into the air passage 21. The inside air intake port 23 is a portion that takes inside air, which is the air inside the passenger compartment, into the air passage 21.

A defroster blowout port 24, a face blowout port 25, and a foot blowout port 26 are formed in a portion of the air conditioning case 20 on the downstream side in the air flow direction W1. The defroster blowout port 24 blows the air-conditioning air flowing in the air conditioning case 20 toward an inner surface of a windshield of the vehicle. The face blowout port 25 blows the air-conditioning air flowing in the air conditioning case 20 toward a driver or a passenger in a passenger seat. The foot blowout port 26 blows the air-conditioning air flowing in the air conditioning case 20 toward the feet of the driver or the passenger in the passenger seat.

The air conditioning unit 30 generates air-conditioning air using the air introduced into the air passage 21 from the outside air intake port 22 or the inside air intake port 23. The air conditioning unit 30 includes a fan device 31, an evaporator 44, and a heater core 32.

The fan device 31 is disposed on the downstream side of the outside air intake port 22 and the inside air intake port 23 in the air flow direction W1. The fan device 31 rotates when energized to generate an air flow in the air passage 21. By adjusting the amount of current flowing through the fan device 31, the air volume of the air-conditioning air flowing in the air passage 21 is adjusted.

The evaporator 44 is disposed on the downstream side of the fan device 31 in the air flow direction W1. The evaporator 44 is a component of a refrigeration cycle device.

Figure 2:
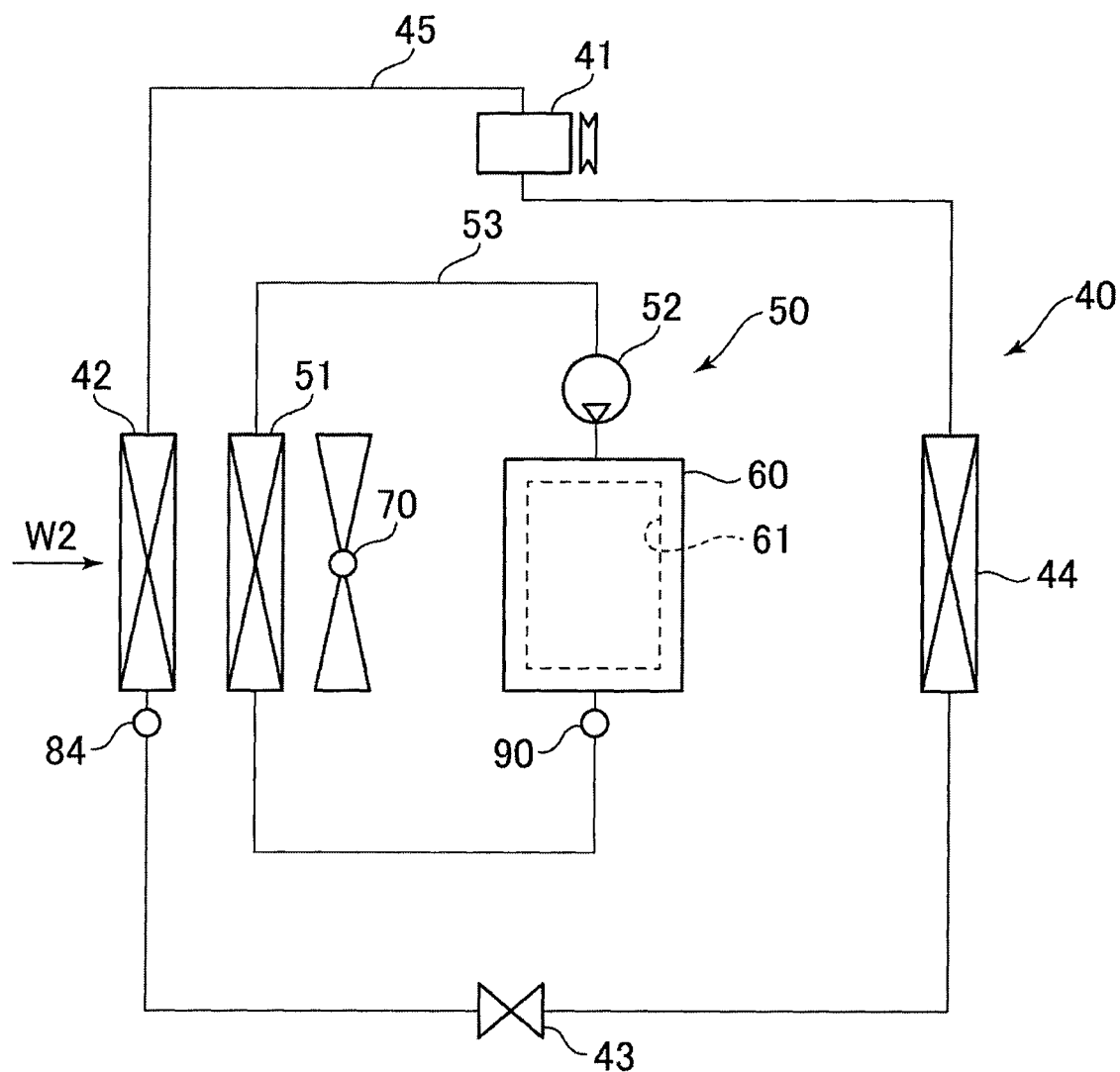
FIG. 2 is a block diagram showing a schematic configuration of a refrigeration cycle device of a vehicle air conditioning device and an engine cooling system according to an embodiment.

As shown in FIG. 2, the refrigeration cycle device 40 includes a compressor 41, a condenser 42, an expansion valve 43, and the evaporator 44. The compressor 41, the condenser 42, the expansion valve 43, and the evaporator 44 are connected in a cycle via a refrigerant passage 45.

The compressor 41 compresses and discharges the refrigerant discharged from the evaporator 44. The compressor 41 is a so called electric compressor that is driven based on energization. The condenser 42 exchanges heat between the refrigerant discharged from the compressor 41 and outside air, which is air outside the passenger compartment, to radiate heat and cool the refrigerant. Then, the condenser 42 discharges the cooled refrigerant. The expansion valve 43 expands and decompresses the refrigerant discharged from the condenser 42, then discharges the decompressed refrigerant. The evaporator 44 exchanges heat between the refrigerant discharged from the expansion valve 43 and the air-conditioning air flowing in the air passage 21 shown in FIG. 1, to vaporize the refrigerant through evaporation. The evaporator 44 has a function of cooling the air-conditioning air in the air passage 21 by utilizing vaporization heat when the refrigerant is vaporized, and a function of dehumidifying the air-conditioning air in the air passage 21.

The heater core 32 is disposed on the downstream side of the evaporator 44 in the air flow direction W1. The heater core 32 heats the air-conditioning air in the air passage 21 using engine cooling water circulating through an engine as a heat source.

The air conditioning unit 30 further includes an inside/outside air switching door 33, an air mix door 34, and blowout port switching doors 35. The inside/outside air switching door 33 switches the air taken into the air passage 21 between outside air and inside air by opening and closing the outside air intake port 22 and the inside air intake port 23. The air mix door 34 adjusts the ratio between the air volume of the air passing through the heater core 32 and the air volume of the air bypassing the heater core 32. The temperature of the air-conditioning air is adjusted by adjusting the ratio between the air volume of the air passing through the heater core 32 and the air volume of the air bypassing the heater core 32, which depends on the opening degree of the air mix door 34. The blowout port switching doors 35 open and close each of the defroster blowout port 24, the face blowout port 25, and the foot blowout port 26. Air-conditioning air generated in the air conditioning case 20 is blown out from those of the blowout ports 24 to 26 which are in an opened state into the passenger compartment.

Next, referring to FIG. 2, an engine cooling system for cooling the engine will be described.

As shown in FIG. 2, an engine cooling system 50 includes a radiator 51 and a water pump 52.

The radiator 51 is disposed downstream of the condenser 42 in an air flow direction W2. The air flow direction W2 indicates the direction in which outside air flows. The radiator 51 cools cooling water flowing inside the radiator 51 by exchanging heat between the cooling water and the outside air flowing outside. The radiator 51 is connected to a water jacket 61 of the engine 60 in a cycle via a cooling water passage 53. The cooling water passage 53 has a function of supplying the cooling water cooled in the radiator 51 to the water jacket 61, and a function of returning the cooling water heated by absorbing the heat of the engine 60 in the water jacket 61 to the radiator 51.

The water pump 52 is provided in the cooling water passage 53. The water pump 52 circulates the cooling water in the cooling water passage 53 by pressure-feeding the cooling water flowing through the cooling water passage 53. The water pump 52 is driven by using motive power from the engine 60.

The engine cooling system 50 further includes a fan device 70 for blowing outside air to the condenser 42 and the radiator 51. While the vehicle is traveling, outside air is supplied to the condenser 42 and the radiator 51 due to wind relative to the vehicle. When the traveling speed of the vehicle is low, or when the vehicle is stopped, the amount of external air supplied to the condenser 42 and the radiator 51 due to wind relative to the vehicle decreases. Under such circumstances, the fan device 70 rotates to generate an outside air flow in the direction indicated by the arrow W2, thereby maintaining the air volume of outside air supplied to the condenser 42 and the radiator 51.

Figure 3:
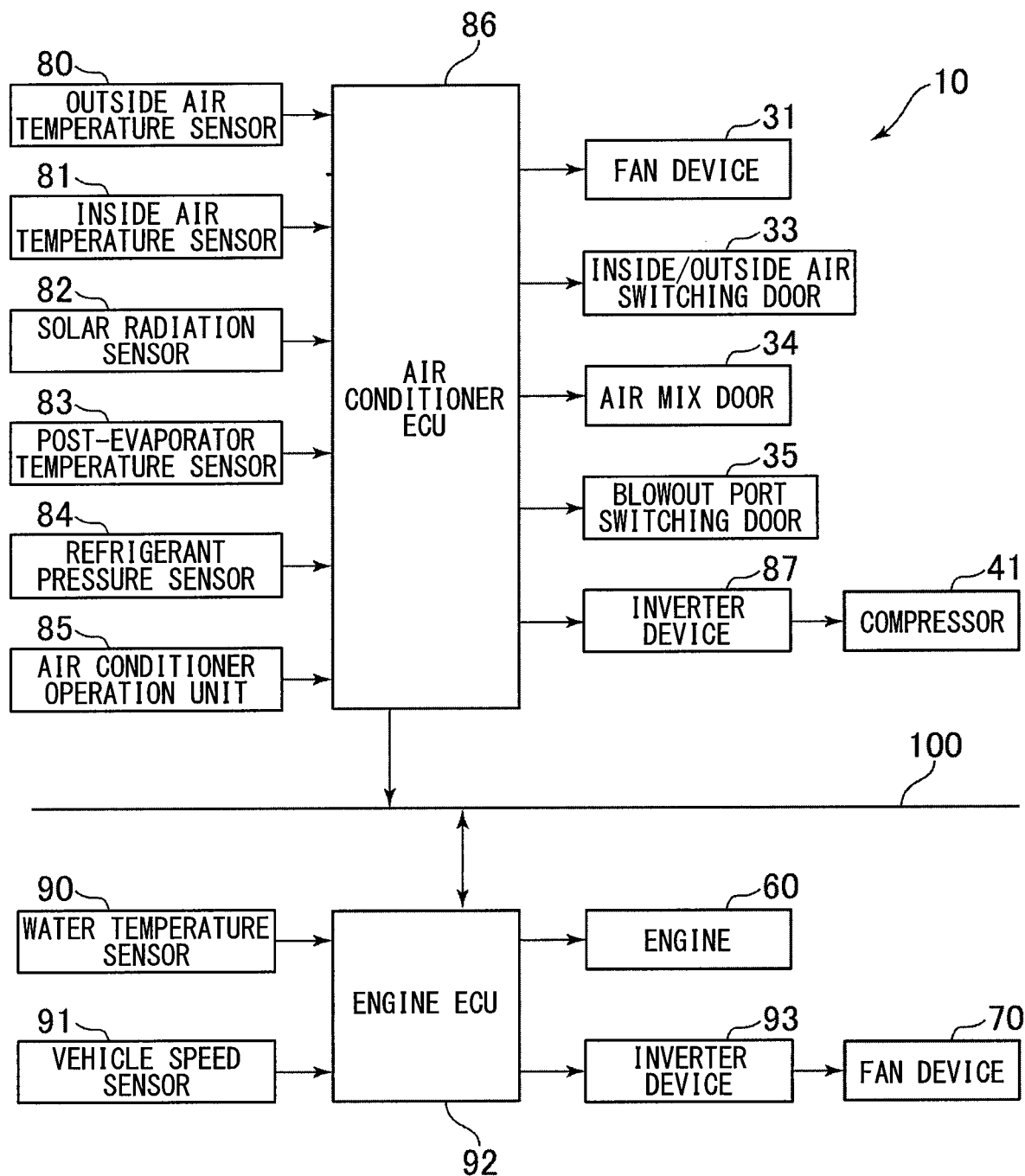
FIG. 3 is a block diagram showing an electrical configuration of a vehicle air conditioning device and an engine control system according to an embodiment.

Next, with reference to FIG. 3, an electrical configuration of the vehicle air conditioning device 10 of the present embodiment will be described.

The vehicle air conditioning device 10 includes an outside air temperature sensor 80, an inside air temperature sensor 81, a solar radiation sensor 82, a post-evaporator temperature sensor 83, a refrigerant pressure sensor 84, an air conditioner operation unit 85, and an air conditioner ECU (Electronic Control Unit) 86. In the present embodiment, the air conditioner ECU 86 corresponds to a controller.

The outside air temperature sensor 80 detects an outside air temperature Tout which is the temperature outside of the passenger compartment, and outputs a signal corresponding to the detected outside air temperature Tout. The inside air temperature sensor 81 detects an inside air temperature Tin which is the temperature inside the passenger compartment, and outputs a signal corresponding to the detected inside air temperature Tin. The solar radiation sensor 82 detects a solar radiation amount As and outputs a signal corresponding to the detected solar radiation amount As. The post-evaporator temperature sensor 83 detects a temperature Te of the air having passed through the evaporator 44 in the air passage 21, and outputs a signal corresponding to the detected post-evaporator temperature Te. As shown in FIG. 2, the refrigerant pressure sensor 84 detects a pressure Pr of the refrigerant immediately before flowing into the condenser 42 and outputs a signal corresponding to the detected refrigerant pressure Pr. The refrigerant pressure Pr is a parameter indicating the load state of the refrigerant in the refrigeration cycle device 40. The air conditioner operation unit 85 is a portion operated by a vehicle occupant when performing various operations of the vehicle air conditioning device 10. The air conditioner operation unit 85 outputs a signal corresponding to the operation of the vehicle occupant.

The air conditioner ECU 86 comprehensively controls the vehicle air conditioning device 10. The air conditioner ECU 86 is mainly composed of one or more microcomputers having a CPU, a memory, and the like.

An output signal from each of the outside air temperature sensor 80, the inside air temperature sensor 81, the solar radiation sensor 82, the post-evaporator temperature sensor 83, the refrigerant pressure sensor 84, and the air conditioner operation unit 85 are input to the air conditioner ECU 86. Based on these output signals, the air conditioner ECU 86 acquires the outside air temperature Tout, the inside air temperature Tin, the solar radiation amount As, the post-evaporator temperature Te, the refrigerant pressure Pr, and operation information from the air conditioner operation unit 85. Then, based on this information, the air conditioner ECU 86 controls the fan device 31, the inside/outside air switching door 33, the air mix door 34, the blowout port switching door 35, and the compressor 41. The air conditioner ECU 86 controls the rotation speed of the compressor 41 by controlling a duty ratio of the amount of electricity supplied to the compressor 41 via the inverter device 87.

The air conditioner ECU 86 is communicably connected to an engine ECU 92 via a vehicle network 100. The engine ECU 92 comprehensively controls the engine 60 and the fan device 70. The engine ECU 92 is mainly composed of a microcomputer having a CPU, a memory, and the like. The engine ECU 92 receives output signals from each of a water temperature sensor 90 and a vehicle speed sensor 91.

As shown in FIG. 2, the water temperature sensor 90 detects a temperature Tc of the cooling water immediately after being discharged from the water jacket 61 of the engine 60 and outputs a signal corresponding to the detected cooling water temperature Tc. The vehicle speed sensor 91 detects a speed Vc of the vehicle and outputs a signal corresponding to the detected vehicle speed Vc.

Based on the output signals of these sensors 90, 91, the engine ECU 92 acquires the information of the cooling water temperature Tc and the vehicle speed Vc. The engine ECU 92 also acquires various parameters necessary for controlling the engine 60 based on output signals from various sensors mounted on the vehicle. Further, the engine ECU 92 and the air conditioner ECU 86 transmit and receive various information via the vehicle network 100. The engine ECU 92 controls the engine 60 and the fan device 70 based on this information. The engine ECU 92 controls the rotation speed of the fan device 70 by control a duty ratio of the amount of current flowing through the fan device 70 via the inverter device 93.

Next, the operation of the air conditioner ECU 86 and the engine ECU 92 will be described in detail.

The engine ECU 92 acquires information of the refrigerant pressure Pr from the air conditioner ECU 86 via the vehicle network 100. The engine ECU 92 calculates an energization duty value Df of the fan device 70 based on the acquired refrigerant pressure Pr and the cooling water temperature Tc detected by the water temperature sensor 90.

Figure 4:
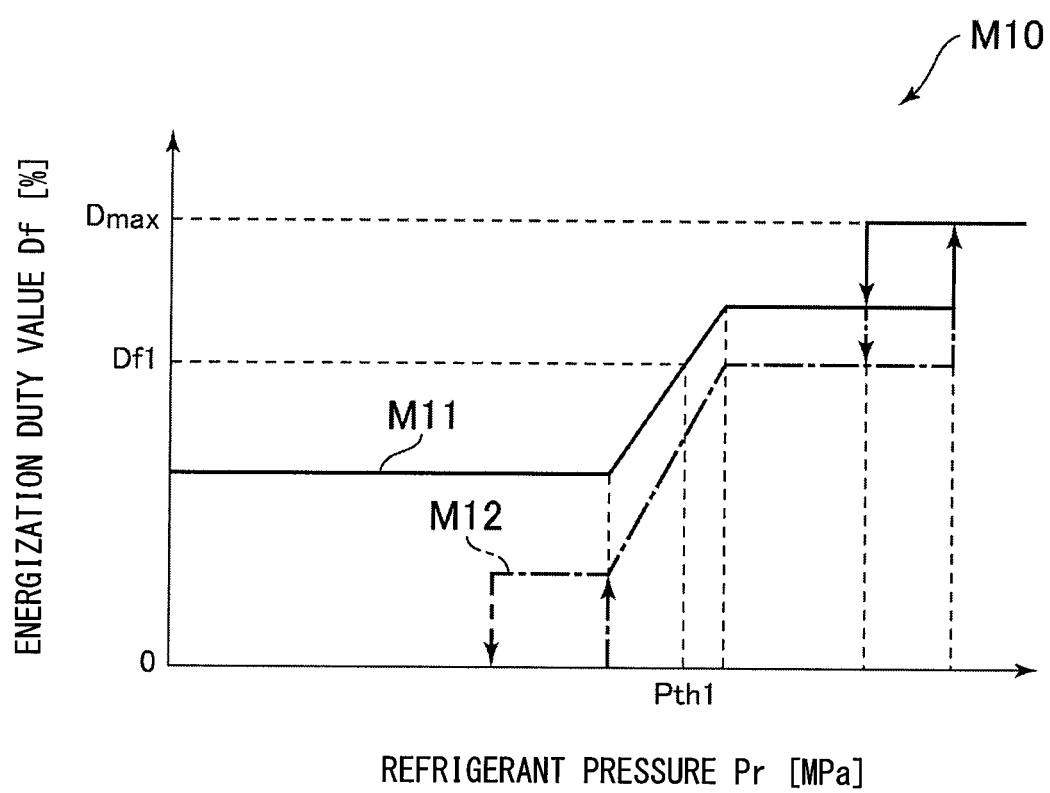
FIG. 4 is a map showing a relationship between a refrigerant pressure and an energization duty value used in a vehicle air conditioning device according to an embodiment.

More specifically, a map M10 showing the relationship between the refrigerant pressure Pr and the energization duty value Df as shown in FIG. 4 is stored in advance in the memory of the engine ECU 92. In FIG. 4, "Dmax" indicates the maximum value of the energization duty value. The map M10 is composed of a low-speed map M11 indicated by a solid line and a normal map M12 indicated by an alternate long and short dashed line. In essence, in the low-speed map M11 and the normal map M12, as the refrigerant pressure Pr increases, the energization duty value Df is set to a larger value. Further, in the low speed map M11, the energization duty value Df is set to a value larger than in the normal map M12. When the vehicle speed Vc is equal to or higher than a predetermined speed Vth1, the engine ECU 92 calculates the energization duty value Df from the refrigerant pressure Pr by using the normal map M12. The predetermined speed Vth1 may be set to 20 [km/h], for example. Further, when the vehicle speed Vc is less than the predetermined speed Vth1, the engine ECU 92 calculates the energization duty value Df from the refrigerant pressure Pr by using the low-speed map M11, in which the energization duty value Df is set to a larger value than in the normal map M12. This is because when the vehicle speed Vc is less than the predetermined speed Vth1, the air volume of outside air supplied to the condenser 42 and the radiator 51 due to wind relative to the vehicle decreases, and therefore it is necessary to increase the rotation speed of the fan device 70.

Based on the calculated energization duty value Df, the engine ECU 92 controls the duty ratio of the energization amount supplied from the inverter device 93 to the fan device 70. As the energization duty value Df increases, the energization amount of the fan device 70 increases, so that the rotation speed of the fan device 70 increases. The engine ECU 92 controls the rotation speed of the fan device 70 based on such energization control.

Further, the engine ECU 92 monitors the cooling water temperature Tc. When the cooling water temperature Tc becomes equal to or higher than a predetermined temperature, regardless of the calculation result based on the map M10 shown in FIG. 4, the energization duty value Df is set to the maximum value Dmax.

Meanwhile, the air conditioner ECU 86 calculates a target blowout temperature TAO based on a set temperature Tset input to the air conditioner operation unit 85, the outside air temperature Tout, the inside air temperature Tin, and the solar radiation amount As. Then, based on the calculated target blowout temperature TAO, the air conditioner ECU 86 calculates the air volume of the fan device 31 and the opening degree of the air mix door 34, and controls the fan device 31 and the air mix door 34 based on these calculated values.

In addition, the air conditioner ECU 86 calculates a target post-evaporator temperature TEO based on the target blowout temperature TAO. The target post-evaporator temperature TEO is a target value of the temperature of the air having passed through the evaporator 44. The air conditioner ECU 86 calculates a target rotation speed NAC, which is a target value of the rotation speed of the compressor 41, by performing feedback control which adjusts the post-evaporator temperature Te detected by the post-evaporator temperature sensor 83 toward the target post-evaporator temperature TEO. The air conditioner ECU 86 calculates an energization duty value Dc of the compressor 41 so as to adjust the actual rotation speed NAC of the compressor 41 toward a target rotation speed NC. The air conditioner ECU 86 controls the duty ratio of the amount of current supplied from the inverter device 87 to the compressor 41 based on the calculated energization duty value Dc. As the energizing duty value Dc increases, the energizing amount of the compressor 41 increases, so that the rotation speed of the compressor 41 increases. The air conditioner ECU 86 controls the rotation speed of the compressor 41 based on such energization control.

Further, the air conditioner ECU 86 sets an upper limit value Nmax of the rotation speed of the compressor 41 based on the vehicle speed Vc and the refrigerant pressure Pr.

Next, referring to FIG. 5, a process for setting the rotation speed upper limit value Nmax by the air conditioner ECU 86 will be described in detail. The air conditioner ECU 86 repeatedly executes the process shown in FIG. 5 with a predetermined period.

Figure 5:
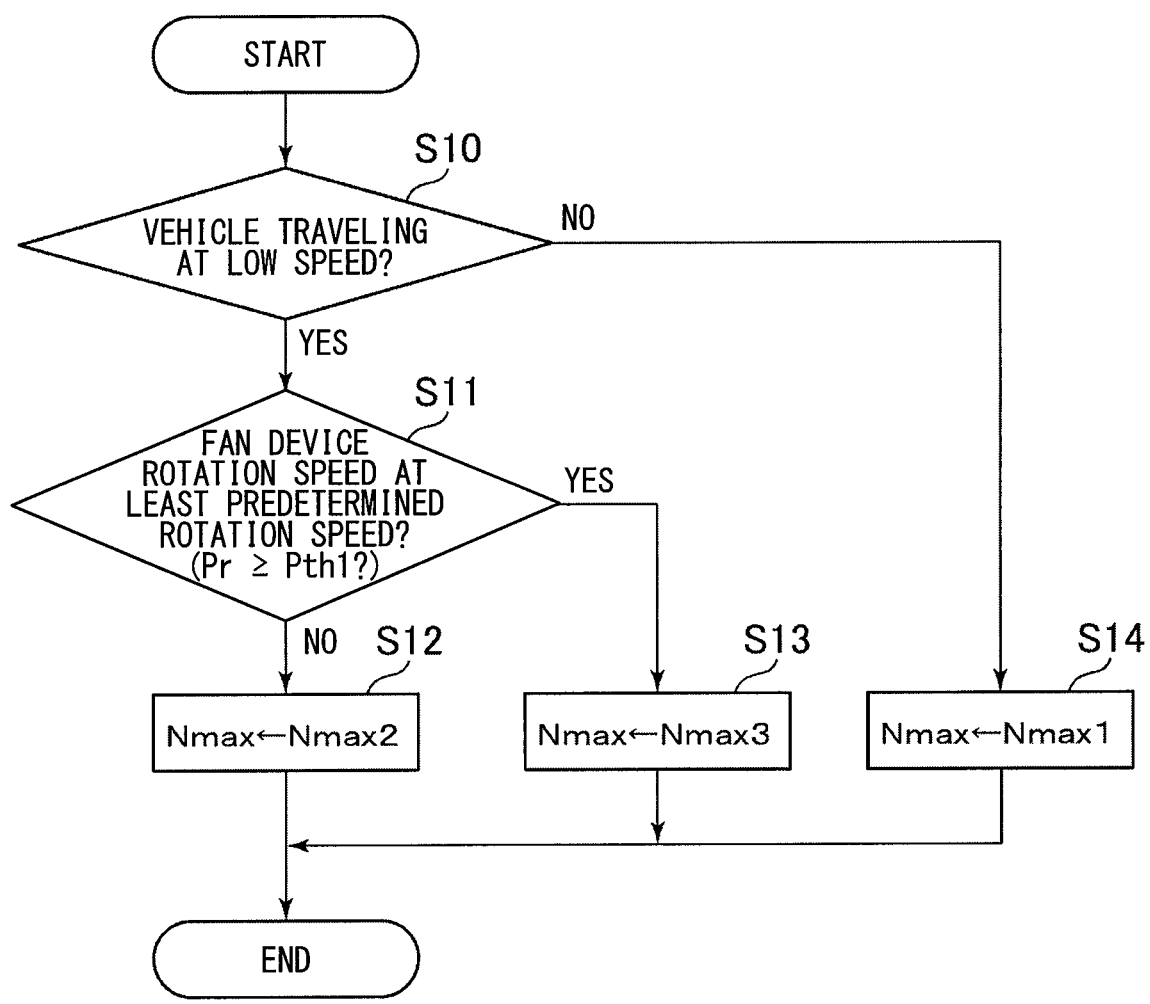
FIG. 5 is a flowchart showing steps of a process for setting a rotation speed upper limit value of a fan device executed by a vehicle air conditioning device according to an embodiment.

As shown in FIG. 5, the air-conditioner ECU 86 first determines in step S10 whether or not the vehicle is traveling at a low speed. Specifically, when the vehicle speed Vc is equal to or less than a predetermined speed Vth2, the air conditioner ECU 86 determines that the vehicle is traveling at a low speed. Further, when the vehicle speed Vc exceeds the predetermined speed Vth2, the air conditioner ECU 86 determines that the vehicle is traveling at medium speed or high speed. The predetermined speed Vth2 is determined in advance, for example experimentally, such that the air conditioner ECU 86 is able to determine whether or not the vehicle is traveling at a low speed. The predetermined speed Vth2 is stored in the memory of the air conditioner ECU 86.

When a negative determination is made in step S10, that is, when the vehicle is traveling at medium speed or high speed, the air conditioner ECU 86 sets the upper limit value Nmax of the rotation speed of the compressor 41 to a first upper limit value Nmax1 in step S14. The first upper limit value Nmax1 is set to the maximum value of the rotation speed of the compressor 41 at which it is difficult for a vehicle occupant or a person near the vehicle like to perceive the operating sound of the compressor 41 as noise while the vehicle is traveling at medium speed or high speed. For the sake of convenience, any subject who may perceive this noise will be abbreviated as "a person around the vehicle or the like" hereinafter. The first upper limit value Nmax1 is obtained in advance, for example experimentally, and is stored in the memory of the air conditioner ECU 86.

When an affirmative determination is made in step S10, that is, when the vehicle is traveling at a low speed, the air conditioner ECU 86 determines in step S11 whether the rotation speed of the fan device 70 is equal to or higher than a predetermined rotation speed. The predetermined rotation speed is a value which allows determining whether or not the fan device 70 is rotating at a rotation speed at which the noise of the compressor 41 can be masked by the noise of the fan device 70.

Specifically, the energization duty value Df of the fan device 70 is set based on the refrigerant pressure Pr as shown in FIG. 4. Therefore, the rotation speed of the fan device 70 is correlated with the refrigerant pressure Pr. Using this, the air-conditioner ECU 86 estimates that the rotation speed of the fan device 70 is equal to or higher than the predetermined rotation speed based on the refrigerant pressure Pr being equal to or higher than a predetermined pressure Pth1. Further, the air-conditioner ECU 86 estimates that the rotation speed of the fan device 70 is less than the predetermined rotation speed based on the refrigerant pressure Pr being less than the predetermined pressure Pth1. The predetermined pressure Pth1 is set in advance experimentally or the like to a value that allows determining whether or not the rotation speed of the fan device 70 is equal to or higher than the predetermined rotation speed, and is stored in the memory of the air conditioner ECU 86.

The air conditioner ECU 86 makes a negative determination in step S11 when the refrigerant pressure Pr is lower than the predetermined pressure Pth1. That is, the air conditioner ECU 86 estimates that the rotation speed of the fan device 70 is less than the predetermined rotation speed. In this case, in step S12, the air conditioner ECU 86 sets the upper limit value Nmax of the rotation speed of the compressor 41 to a second upper limit value Nmax2. The second upper limit value Nmax2 is set to the maximum value of the rotation speed of the compressor 41 at which a person around the vehicle or the like does not perceive the operating sound of the compressor 41 as noise when the vehicle is stopped or traveling at low speed. The second upper limit value Nmax2 is a value smaller than the first upper limit value Nmax1. The second upper limit value Nmax2 is obtained in advance, for example experimentally, and is stored in the memory of the air conditioner ECU 86.

The air conditioner ECU 86 makes a positive determination in step S11 when the refrigerant pressure Pr is equal to or higher than the predetermined pressure Pth1. That is, the air conditioner ECU 86 estimates that the rotation speed of the fan device 70 is equal to or greater than the predetermined rotation speed. In this case, the noise of the compressor 41 can be masked by the noise of the fan device 70. Therefore, in step S13, the air conditioner ECU 86 sets the rotation speed upper limit value Nmax of the compressor 41 to a third upper limit value Nmax3 which is smaller than the first upper limit value Nmax1 and larger than the second upper limit value Nmax2. The third upper limit value Nmax3 is set to the maximum value of the rotation speed of the compressor 41 at which it is difficult for a person around the vehicle or the like to perceive the operation sound of the compressor 41 as noise due to being masked by the noise of the fan device 70. The third upper limit value Nmax3 is obtained in advance, for example experimentally, and is stored in the memory of the air conditioner ECU 86.

Next, an operation example of the vehicle air conditioning device 10 of the present embodiment will be described.

Figure 6:
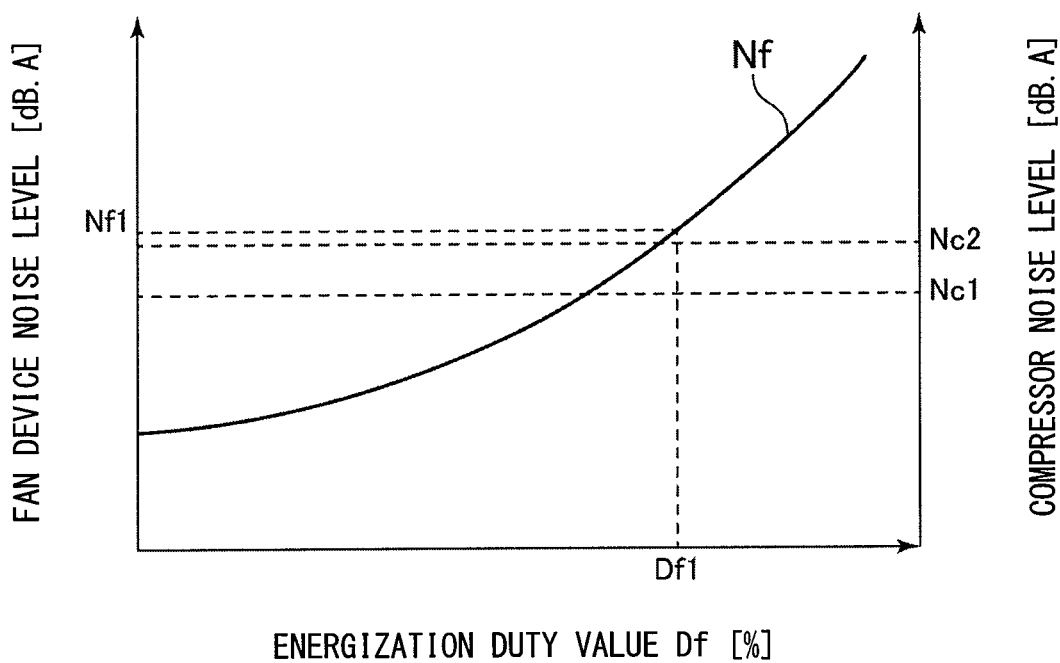
FIG. 6 is a graph showing a relationship between an energization duty value and noise levels in a vehicle air conditioning device according to an embodiment.

When the vehicle is traveling at a low speed and the refrigerant pressure Pr is equal to or higher than the predetermined pressure Pth1, as shown in FIG. 4, the energization duty value Df of the fan device 70 is set to be equal to or greater than a predetermined value Df1. Meanwhile, as shown by the solid line Nf in FIG. 6, the external noise level of the fan device 70 is approximately proportional to the energization duty value Df of the fan device 70. Therefore, when the energization duty value Df is equal to or greater than the predetermined value Df1, the external noise level of the fan device 70 becomes equal to or higher than a predetermined level Nf1.

Meanwhile, when the rotation speed upper limit value Nmax of the compressor 41 is set to the second upper limit value Nmax2, the noise level of the compressor 41 is equal to or lower than a target noise level Nc1. The target noise level Nc1 is a maximum noise level at which it is difficult for a person around the vehicle or the like to perceive the operating sound of the compressor 41 as noise when the vehicle is stopped or traveling at low speed.

Further, when the external noise level of the fan device 70 is equal to or higher than the predetermined level Nf1, the upper limit value Nmax of the rotation speed of the compressor 41 is set to the third upper limit value Nmax3, which is larger than the second upper limit value Nmax2. For this reason, the maximum value of the noise level of the compressor 41 is the noise level Nc2 which is larger than the target noise level Nc1. However, in this case, since the noise level of the fan device 70 is greater than the maximum noise level Nc2 of the compressor 41, the noise of the compressor 41 is masked by the noise of the fan device 70. This is due to the following reasons.

Since the operation sound of the fan device 70 that blows the outside air to the condenser 42 and the radiator 51 is a familiar sound, a person around the vehicle or the like is unlikely to feel uncomfortable. On the other hand, since the operation sound of the compressor 41 is an unpleasant sound as compared with the operation sound of the fan device 70, it is more likely for a person around the vehicle or the like to perceive noise. For this reason, if the noise level of the fan device 70 is higher than the noise level of the compressor 41, the noise of the compressor 41 is masked by the noise of the fan device 70, so that it is difficult for the operating sound of the compressor 41 to be perceived as noise.

According to the vehicle air conditioning device 10 of the present embodiment described above, it is possible to obtain the functions and effects described in the following (1) and (2).

(1) Even when the vehicle is traveling at a low speed, the rotation speed of the compressor 41 can be increased up to the third upper limit value Nmax3, so that the cooling performance can be improved. In addition, since the noise of the compressor 41 is masked by the noise of the fan device 70, it is difficult for a person around the vehicle or the like to perceive the noise of the compressor 41. Therefore, discomfort may be reduced for people around the vehicle and the like. Further, it is unnecessary to increase the mass of the compressor 41 or to improve the sound insulation properties of the vehicle in order to reduce the noise of the compressor 41. Accordingly, it is possible to reduce costs.

(2) The air-conditioner ECU 86 determines that the rotation speed of the fan device 70 is less than the predetermined rotation speed based on the refrigerant pressure Pr being less than the predetermined pressure Pth1. Further, the air-conditioner ECU 86 determines that the rotation speed of the fan device 70 is equal to or higher than the predetermined rotation speed based on the refrigerant pressure Pr being equal to or higher than a predetermined pressure Pth1. Due to this, it is possible to easily estimate the rotation speed of the fan device 70, without requiring a sensor that directly measures the rotation speed of the fan device 70.

In view of the above points (1) and (2), the aspects of the present disclosure are able to provide a vehicle air conditioning device in which it is difficult to perceive the noise of the compressor while cooling performance is improved. In particular, due to recent demands for weight reduction of vehicle parts, a reduction of the mass of electric compressors is often carried out. In the case of reducing the weight of the electric compressor, if the output of the electric compressor is maintained equal to those of conventional compressors, vibrations tend to occur. When this vibration is transmitted to the engine, the radiated sound generated from the engine becomes greater. As a tradeoff, in order to suppress such noise, it is also conceivable to reduce the second upper limit value as compared to conventional values. However, when using this method, since the upper limit value of the rotation speed of the electric compressor is lower than conventional values, the performance of such a refrigeration cycle device may deteriorate. In contrast, due to the effects of above points (1) and (2), the vehicle air conditioning device 10 of the present disclosure allows for the use of a low-mass electric compressor while reducing the perception of noise and also ensuring sufficient cooling performance.

It should be noted that the above described embodiment may be modified as follows.

Figure 7:
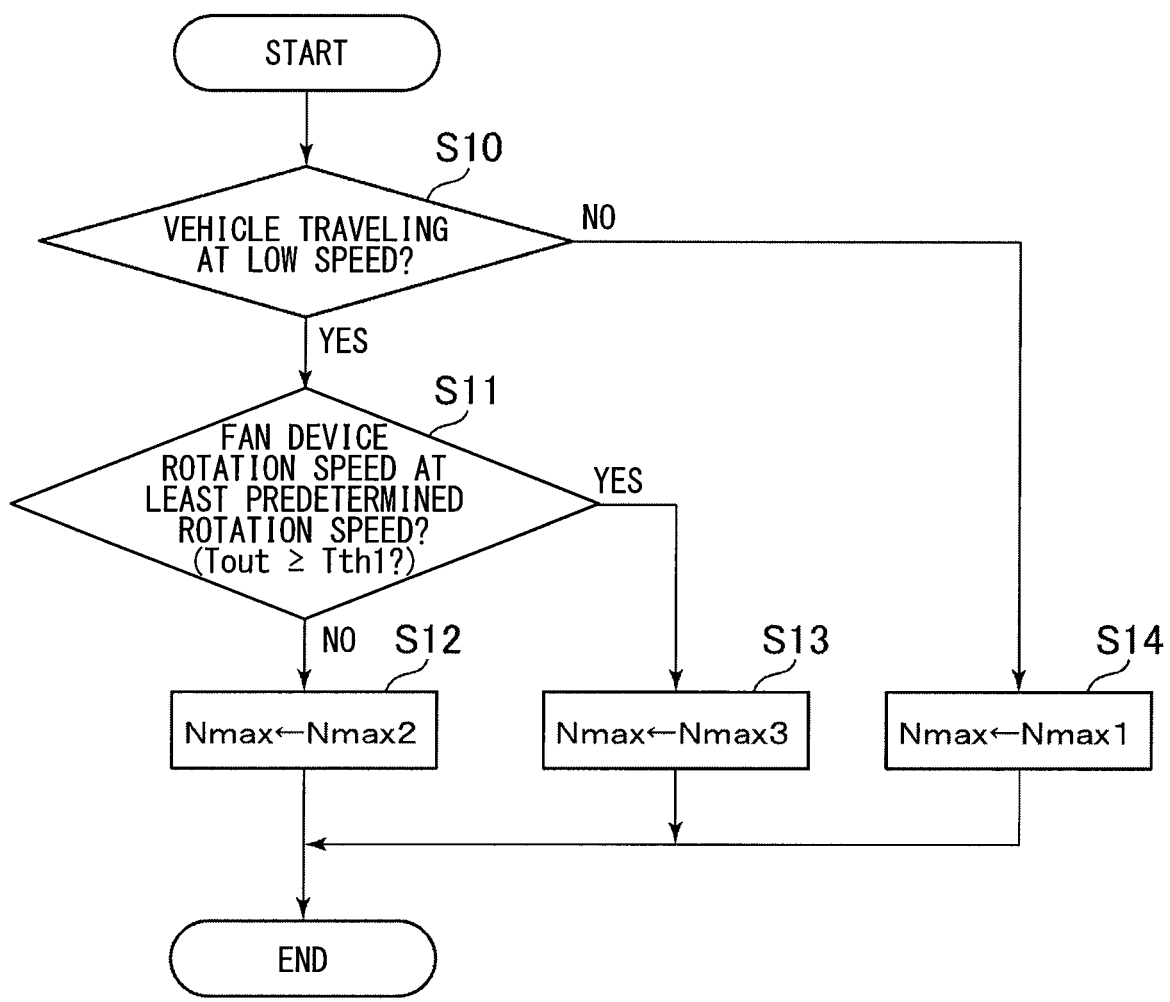
FIG. 7 is a flowchart showing steps of a process for setting a rotation speed upper limit value of a fan device executed by a vehicle air conditioning device according to an embodiment.

The refrigerant pressure Pr and the outside air temperature Tout are proportional to each other. Therefore, as shown in FIG. 7, in step S11, the air conditioner ECU 86 may, as an alternative, perform a process of determining whether or not the outside air temperature Tout is equal to or higher than a predetermined temperature Tth1. That is, the air-conditioner ECU 86 estimates that the rotation speed of the fan device 70 is less than the predetermined rotation speed based on the outside air temperature Tout being less than the predetermined temperature Tth1. Further, the air-conditioner ECU 86 estimates that the rotation speed of the fan device 70 is equal to or greater than the predetermined rotation speed based on the outside air temperature Tout being equal to or greater than the predetermined temperature Tth1. According to such a configuration, in the vehicle air conditioning device 10, instead of the refrigerant pressure sensor 84, a refrigerant pressure switch that outputs a signal when an arbitrary refrigerant pressure is reached can be used. As a result, the design of the vehicle air conditioning device 10 may be simplified, and costs may be reduced as well.

Figure 8:
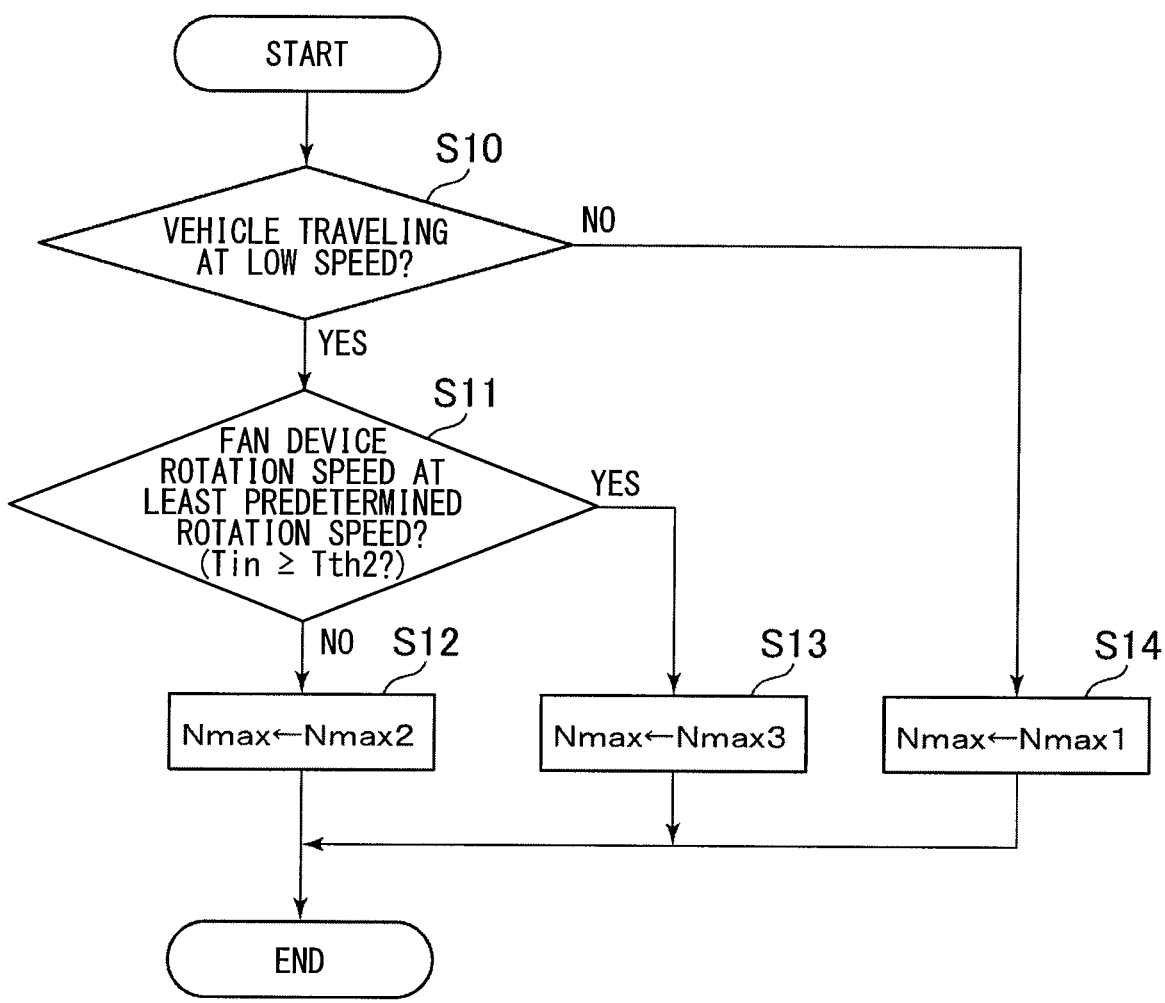
FIG. 8 is a flowchart showing steps of a process for setting a rotation speed upper limit value of a fan device executed by a vehicle air conditioning device according to an embodiment.

Similarly, the refrigerant pressure Pr and the inside air temperature Tin are proportional to each other. Therefore, as shown in FIG. 8, in step S11, the air conditioner ECU 86 may, as an alternative, perform a process of determining whether or not the inside air temperature Tin is equal to or higher than a predetermined temperature Tth2. That is, the air-conditioner ECU 86 estimates that the rotation speed of the fan device 70 is less than the predetermined rotation speed based on the inside air temperature Tin being less than the predetermined temperature Tth2. Further, the air-conditioner ECU 86 estimates that the rotation speed of the fan device 70 is equal to or greater than the predetermined rotation speed based on the inside air temperature Tin being equal to or greater than the predetermined temperature Tth2. Due to this, in the vehicle air conditioning device 10, instead of the refrigerant pressure sensor 84, the refrigerant pressure switch can be used. As a result, the design of the vehicle air conditioning device 10 may be simplified, and costs may be reduced as well.

The means and/or functions provided by the air conditioner ECU 86 and the engine ECU 92 can be provided by software stored in a tangible memory, one or more computers executing that software, software alone, hardware alone, or a combination of software and hardware. For example, when the air conditioner ECU 86 and the engine ECU 92 are provided by one or more electronic circuits which is hardware, these electronic circuits may be provided by one of more digital circuits including a plurality of logic circuits, or one or more analog circuits.

The present disclosure is not limited to the above specific examples. Those skilled in the art may appropriately modify the above described specific examples, and these modifications are also included in the scope of the present disclosure as long as they have the features of the present disclosure. The elements, the arrangement, the conditions, the shape, etc. of the specific examples described above are not limited to those exemplified and can be appropriately modified. The combinations of elements included in each of the above described specific examples can be appropriately modified as long as no technical inconsistency occurs.

The invention claimed is:

1. A vehicle air conditioning device, comprising:
   a compressor that compresses refrigerant;
   a condenser that cools the refrigerant discharged from the compressor by exchanging heat between the refrigerant and air;
   an expansion valve that expands the refrigerant discharged from the condenser;
   an evaporator that cools air-conditioning air, which is to be blown into a passenger compartment, by exchanging heat between the refrigerant discharged from the expansion valve and the air-conditioning air;
   a controller that controls the compressor; and
   a refrigerant pressure sensor that detects a pressure of the refrigerant wherein
   the controller is configured to
      set an upper limit value of a rotation speed of the compressor to a first upper limit value when a speed of a vehicle is equal to or higher than a predetermined speed, set the upper limit value of the rotation speed of the compressor to a second upper limit value smaller than the first upper limit value when the speed of the vehicle is lower than the predetermined speed and a rotation speed of a fan device that sends air to the condenser is lower than a predetermined rotation speed, set the upper limit value of the rotation speed of the compressor to a third upper limit value smaller than the first upper limit value and larger than the second upper limit value when the speed of the vehicle is lower than the predetermined speed and the rotation speed of the fan device is equal to or higher than the predetermined rotation speed, and estimate that the rotation speed of the fan device is lower than the predetermined rotation speed based the pressure of the refrigerant being less than a predetermined pressure, and estimate that the rotation speed of the fan device is equal to or higher than the predetermined rotation speed based on the pressure of the refrigerant being equal to or higher than the predetermined pressure.

2. A vehicle air conditioning device, comprising:

a compressor that compresses refrigerant;

a condenser that cools the refrigerant discharged from the compressor by exchanging heat between the refrigerant and air;

an expansion valve that expands the refrigerant discharged from the condenser;

an evaporator that cools air-conditioning air, which is to be blown into a passenger compartment, by exchanging heat between the refrigerant discharged from the expansion valve and the air-conditioning air;

a controller that controls the compressor; and an outside air temperature sensor that detects an outside air temperature which is a temperature outside the passenger compartment, wherein the controller is configured to set an upper limit value of a rotation speed of the compressor to a first upper limit value when a speed of a vehicle is equal to or higher than a predetermined speed, set the upper limit value of the rotation speed of the compressor to a second upper limit value smaller than the first upper limit value when the speed of the vehicle is lower than the predetermined speed and a rotation speed of a fan device that sends air to the condenser is lower than a predetermined rotation speed, set the upper limit value of the rotation speed of the compressor to a third upper limit value smaller than the first upper limit value and larger than the second upper limit value when the speed of the vehicle is lower than the predetermined speed and the rotation speed of the fan device is equal to or higher than the predetermined rotation speed, and estimate that the rotation speed of the fan device is lower than the predetermined rotation speed based the outside temperature being less than a predetermined temperature, and estimate that the rotation speed of the fan device is equal to or higher than the predetermined rotation speed based on the outside temperature being equal to or higher than the predetermined temperature.

3. A vehicle air conditioning device, comprising:

a compressor that compresses refrigerant;

a condenser that cools the refrigerant discharged from the compressor by exchanging heat between the refrigerant and air;

an expansion valve that expands the refrigerant discharged from the condenser;

an evaporator that cools air-conditioning air, which is to be blown into a passenger compartment, by exchanging heat between the refrigerant discharged from the expansion valve and the air-conditioning air;

a controller that controls the compressor; and an inside air temperature sensor that detects an inside air temperature which is a temperature inside the passenger compartment, wherein the controller is configured to set an upper limit value of a rotation speed of the compressor to a first upper limit value when a speed of a vehicle is equal to or higher than a predetermined speed, set the upper limit value of the rotation speed of the compressor to a second upper limit value smaller than the first upper limit value when the speed of the vehicle is lower than the predetermined speed and a rotation speed of a fan device that sends air to the condenser is lower than a predetermined rotation speed, set the upper limit value of the rotation speed of the compressor to a third upper limit value smaller than the first upper limit value and larger than the second upper limit value when the speed of the vehicle is lower than the predetermined speed and the rotation speed of the fan device is equal to or higher than the predetermined rotation speed, and estimate that the rotation speed of the fan device is lower than the predetermined rotation speed based the inside temperature being less than a predetermined temperature, and estimate that the rotation speed of the fan device is equal to or higher than the predetermined rotation speed based on the inside temperature being equal to or higher than the predetermined temperature.

* * * * *